United States Patent
Herkel et al.

(10) Patent No.: US 6,173,814 B1
(45) Date of Patent: Jan. 16, 2001

(54) ELECTRONIC SAFETY SYSTEM FOR ELEVATORS HAVING A DUAL REDUNDANT SAFETY BUS

(75) Inventors: Peter Herkel; Hans-Kilian Spielbauer, both of Berlin (DE)

(73) Assignee: Otis Elevator Company, Farmington, CT (US)

( * ) Notice: Under 35 U.S.C. 154(b), the term of this patent shall be extended for 0 days.

(21) Appl. No.: 09/262,732

(22) Filed: Mar. 4, 1999

(51) Int. Cl.[7] .................................................. B66B 1/32
(52) U.S. Cl. ................................. 187/288; 187/248
(58) Field of Search .................................. 187/277, 288, 187/371, 393, 248

(56) References Cited

U.S. PATENT DOCUMENTS

| | | | |
|---|---|---|---|
| 4,193,478 | * 3/1980 | Keller et al. | 187/29 R |
| 4,246,983 | * 1/1981 | Bril | 187/29 R |
| 4,568,909 | * 2/1986 | Whynacht | 340/21 |
| 4,750,591 | * 6/1988 | Coste et al. | 187/130 |
| 4,898,263 | * 2/1990 | Manske et al. | 187/133 |
| 4,936,419 | * 6/1990 | Stadler et al. | 187/133 |
| 5,360,952 | 11/1994 | Brajczewski et al. | 187/246 |
| 5,387,769 | * 2/1995 | Kupersmith et al. | 187/248 |
| 5,780,788 | * 7/1998 | Eschenbrenner et al. | 187/316 |
| 5,791,440 | * 8/1998 | Lonzinski et al. | 187/223 |
| 5,817,994 | * 10/1998 | Fried et al. | 187/391 |
| 6,056,088 | * 5/2000 | Gerstenkorn | 187/390 |

FOREIGN PATENT DOCUMENTS

| | | | |
|---|---|---|---|
| 40 32 033 A1 | 10/1990 | (DE) | B66B/5/00 |
| 42 07 466 A1 | 3/1992 | (DE) | B66B/1/28 |
| 03166184 | 7/1991 | (JP) | B66B/5/00 |

* cited by examiner

Primary Examiner—Jonathan Salata

(57) ABSTRACT

In accordance with a preferred embodiment of the present invention, an electronic safety system for elevators for preventing unsafe elevator operation has a central controller which monitors a variety of sensors, contacts, and switches over an electronic safety bus. A plurality of bus nodes are distributed throughout the elevator system and are in constant communication with the central controller over the safety bus. The bus nodes interface with sensors, switches, contacts, detectors, components, and other safety equipment of the elevator system at each location and provide status information back to the controller. The controller consists of a microprocessor board with an input/output port in communication with the safety bus and bus nodes. Upon sensing an unsafe condition, the controller sends control signals to an elevator control system and a drive and brake system to arrest the elevator car in a safe manner.

10 Claims, 2 Drawing Sheets

ELECTRONIC SAFETY SYSTEM FOR ELEVATORS HAVING A DUAL REDUNDANT SAFETY BUS

BACKGROUND OF THE INVENTION

1. Field of the Invention

The present invention is generally directed to safety equipment used in elevator systems and more particularly, the present invention is directed to an improved safety system using modem electronic components. The improved safety system greatly improves installation time, quality, manufacturing costs, and operational characteristics.

2. Prior Art

State of the art elevator safety systems are implemented using a Safety Chain which is a serial circuit comprised of switches and contacts. The contacts and switches are operated by the service person and some devices in the elevator. Some devices are controlled by the car such as the overspeed governor, and the limit switch. Others are controlled by the doors, such as the switches and the locks of the landing doors.

The Safety Chain operates relays (or contactors) that handle the power to the motor and the brake. An operation of any contact within the chain will disconnect the motor or drive from the main power supply. Some parts of the Safety Chain might be bridged, other parts might be included to alternate the safety supervision for special modes during inspection, maintenance and rescue operation.

During maintenance and inspection, it is sometimes necessary to include bridges in the Safety Chain by hand for testing and error searching. The bridges may be located throughout the hoistway and car. Manual installation and removal of the bridges is time and labor intensive.

The serial connections of the contacts and the bridging and including of contacts for rescue operation and inspection lead to a long chain which is usually several times (usually six to eight) the length of the hoistway. The length of the Safety Chain leads to the usage of higher voltages in the range of the main voltage to minimize the effects of voltage losses along the chain.

The contacts in the Safety Chain must have a positive opening characteristic. The use of electronic sensors is not allowed in many installations.

Up until very recently, almost all countries required that elevator safety systems be mechanically implemented because of concerns that electronic implementations would be incapacitated by power failures. Regulations have changed, however, in light of the recognized ability of electronic engineers and improved technology. These new designs provide for a fail safe mode in the event of power failures.

Therefore it has been determined that a need exists for an improved design of an elevator safety system which lowers part count and manufacturing costs, all while improving operability.

SUMMARY OF THE INVENTION

In accordance with a preferred embodiment of the present invention, a novel electronic safety system for elevators which improves inspection and diagnostic work, promotes safe elevator operation, and enables safe degradation when an unsafe condition is detected is disclosed. The electronic safety system comprises a modem electronic system including a communications bus which facilitates the exchange of control and data signals between a microprocessor based controller and various other components including bus nodes designed to interface with sensors, contacts, and switches along with detectors, components, and other safety equipment necessary to ensure the safe operation of an elevator system.

A software controlled microprocessor assembly operates a communications bus which has bus nodes throughout the entire elevator system. The bus nodes are periodically polled to ascertain the status of the sensors, contacts, and switches connected to the bus nodes. The microprocessor may operate in one of several different modes such as maintenance, inspection, normal operations, degraded operations, and emergency operations. When appropriate, the microprocessor assembly generates output signals to the elevator control system and the elevator drive and brake system.

The microprocessor receives configuration information from an onboard non-volatile memory which contains data specific to the particular model of elevator and other installation specific parameters. If an unsafe condition occurs, the microprocessor generates the appropriate outputs to be conveyed to the elevator control and drive systems. The electronic safety system may activate devices to arrest the elevator's motion. The microprocessor, communications bus, and associated components provide an electronic safety system which can be centrally managed, greatly improves installation time, quality, manufacturing costs, and operational characteristics.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
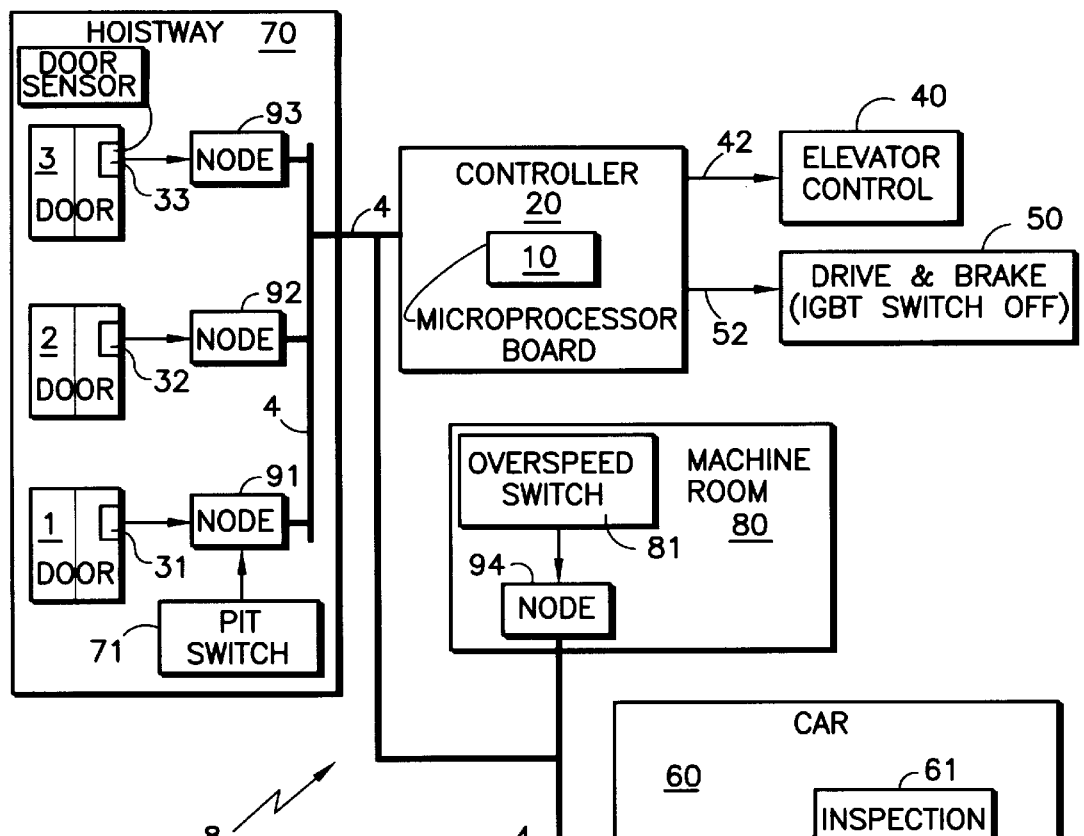
FIG. 1 is a high level system block diagram of an electronic safety system illustrating the system components and interfaces.

Referring to FIG. 1, a high level system block diagram of an electronic safety system 8 illustrating the system components and interfaces is shown. A controller 20 communicates over a safety bus 4 with a plurality of bus nodes 91–96. The safety bus 4 is implemented using a communications protocol known as a Controller Area Network (CAN) bus. Each bus node 91–96 in the system 8 interfaces with various sensors, switches, or other input or output devices as described in greater detail below. The controller 20 continuously processes the data from the bus nodes 91–96 and, under certain conditions, provides an output signal to the elevator control 40 and an output signal to the drive and brake system 50.

An overspeed switch 81 located in the machine room 80 senses the actual velocity of the elevator car 60 and determines if the actual velocity is within predetermined limits for any direction of car travel, up or down. If an overspeed condition is detected, then the overspeed switch 81 sends an overspeed signal to the bus node 94 in the machine room 80. The controller 20 receives the overspeed signal during data communications with the bus node 94 in the machine room 80. Upon sensing an overspeed condition, the controller 20 sends an arrest signal to the drive & brake system 50 through the controller/drive & brake interface 52 to arrest the elevator car 60 in a safe manner. A status signal is also provided by the controller 20 to the elevator control 40 through the controller/elevator control interface 42 indicating that an overspeed condition has occurred.

Referring to the hoistway 70, an individual bus node 91, 92 & 93 is located at each respective floor landing door 1, 2 & 3 to receive inputs from various sensors. Each respective bus node 91, 92 & 93 in the hoistway 70 interfaces with a respective door sensor 31, 32 & 33 on each respective landing door 1, 2 & 3. In the present embodiment there is one landing door 1, 2 & 3 respectively per floor (first floor, second floor, third floor). However in some elevator systems, certain elevator cars may have more than one car door (not shown) and may or may not have more than one landing door at each floor landing. In any case all landing doors at each landing floor would be instrumented in a similar manner with a bus node 91–93 located at each landing door or floor landing. The bus nodes 91–93 provide the door sensor 31–33 status information from each landing door 1–3 to the controller 20 over the safety bus 4. The controller 20 processes the door sensor 31–33 information from each landing door 1–3 to determine control sequences for the elevator car 60. If the controller determines that an unsafe condition exists the controller 20 sends an arrest signal to the drive & brake system 50 through the controller/drive & brake interface 52 to arrest the elevator in a safe manner. A status signal indicating the unsafe condition is also provided by the controller 20 to the elevator control 40 through the controller/elevator control interface 42.

A pit switch 71 is located in the bottom of the elevator hoistway 70 for use by maintenance personnel. The pit switch 71 is connected to the nearest bus node 91 located at the first floor landing. When the controller 20 polls the bus node 91 and senses that the pit switch 71 has been activated, it treats the event as an emergency condition. The controller 20 issues an arrest signal to the drive and brake system 50 to bring the elevator car to an immediate controlled halt. The controller 20 also updates the elevator control 40 with a status signal.

Referring to the elevator car 60, several bus nodes 95 & 96 are located on the car 60 to receive sensor input. Bus node 95 receives data input from inspection switch 61 and data input from emergency stop switch 62. Bus node 96 receives data input from elevator car door switch 63. In an operational mode the controller 20 communicates with each of the bus nodes 95 & 96 located in the elevator car 60 in a responsive manner. If the controller 20 senses an emergency stop switch 62 activation, emergency condition processing is activated. If the controller 20 senses an inspection switch 61 activation, inspection mode processing is activated. The elevator car door switch 63 is monitored by the controller 20 to determine whether the elevator car door 64 is open or shut. The controller 20 determines whether an unsafe condition exists with respect to the elevator car door switch 63 based upon known logic. For example, if the elevator car door 64 opens at a landing, that is not unsafe, while a car door 64 opening as the elevator car moves is usually unsafe.

It will be appreciated by those skilled in the art that the above safety bus 4 design is very flexible and that additional bus nodes 91–96 may be added or dropped as needed with the appropriate changes made in software to process the new data. Also some nodes 91–96 may have spare input/output capacity so that they may interface with additional sensors. It is the modularity of the safety bus 4 that allows these types of modifications to be made in an improved manner over the prior art.

Figure 2:
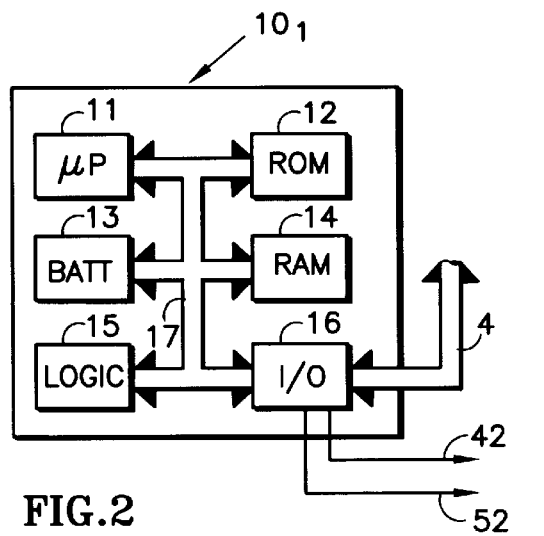
FIG. 2 is a high level system block diagram of a microprocessor assembly illustrating a single microprocessor system and its interfaces.

Single Microprocessor (FIG. 2)

Referring to FIG. 2, a high level system block diagram of a microprocessor assembly $10_1$ illustrating the system components is shown. A general purpose controller or microprocessor 11 communicates over a microprocessor system bus 17 with a read-only memory (ROM) 12, a random access memory (RAM) 14, a power back up unit (BATT) 13, a logic unit 15 and an input/output communications port (I/O) 16. It should be noted that although in this embodiment a ROM 12 is used for a non-volatile memory, other types of non-volatile memory such as EEPROM may be used as well.

The microprocessor 11 executes a software program stored in the ROM 12. The ROM 12 also contains tables of data for the particular elevator installation. Such data may contain installation parameters such as elevator model, elevator modes of operation, number of floors, distance between floors, overspeed threshold values, filter coefficients, and other such data required for initialization and operational software program execution. The ROM 12 may be designed from Flash ROM, so that software updates may be downloaded from a maintenance computer PC (not shown). This method may be used to effect code or data changes or both.

The RAM 14 is used for temporary storage of data values during execution of the software program. It may also hold certain data received from the I/O port 16 or other data ready for transmission to the I/O port 16. The RAM 14 may be designed from non-volatile random access memory (NVRAM) components so as to retain data through any power supply failures, of either a main or a backup power supply 13.

The power back up unit 13 is designed to provide power to the microprocessor assembly $10_1$ until a safe power down can be executed in the event of a main power supply (not shown) failure. When the software program detects that the main power supply has failed, it calls a safe power down routine so as to bring the elevator car to a safe stop.

The microprocessor 11 communicates with the bus nodes 91–96 over the safety bus 4 through I/O port 16. The safety bus 4 may be a dual redundant bus (bus A and bus B) or a single bus (bus A). Thus the microprocessor 11 may communicate with any of the bus nodes 91–96 over either bus A or bus B (not shown) as well known to those skilled in the art. Communications between the microprocessor 11 and the bus nodes 91–96 are scheduled by the software program such that every bus node 91–96 is communicated with periodically regardless of whether data is being provided by the bus node 91–96 or not. Periodic communications allows the software program running on the microprocessor 11 to positively reaffirm that the communications through the safety bus 4 to the bus nodes 91–96, are operational. These periodic messages include status information from hardware checks performed at each bus node 91–96. In one embodiment of a normal operational mode, each bus node 91–96 is polled twice on the same data set, and the data sets are compared by the software program to make sure they are identical. If the data sets do not match, the software program polls the bus node 91–96 again to determine it's reliability. The software program may determine the mismatched data was a one time anomaly or it may determine that there is a communications failure which needs repair. The software program may also shut down the elevator if it determines communications with the bus nodes 91–96 have become unreliable and thus continuing operations is unsafe.

Bus Nodes and Sensors

At each bus node 91–96, a variety of sensors, contacts or switches may be sending data to the bus node 91–96. These data gathering devices may be wired to the bus node 91–96 in parallel or in series or in a combination of the two depending on the quantity of sensors, contacts or switches being monitored by a particular bus node 91–96. However it is desirable to have as many sensors, contacts or switches wired in parallel with each other so that when the bus node 91–96 receives an input from one of these devices, the bus node 91–96 will know which particular device is sending information to it. This architecture allows the software program executing on the microprocessor 11 to pinpoint the source and condition causing the data signal. In a serial wiring circuit, the software program can only identify the data signal to a circuit level.

Power is delivered to the sensors, contacts or switches by the bus nodes 91–96. Due to the short distances between the bus nodes 91–96 and the sensors, contacts or switches, a lower voltage can be used, in this case 24 Vdc.

The sensors, contacts or switches can be automatically tested by the software program. This feature obviates the need for manual checks and reduces inspection times. It also allows a service routine to be expanded in time and focus on other critical maintenance areas.

Software Program

The software program runs in various modes such as inspection and maintenance, normal operations and emergency operations. It performs various routines or calls such as polling the bus nodes 91–96 for communication status and data. The program also outputs control signals and data to elevator control system 40 and drive and brake system 50.

Bus Polling

Bus polling is implemented by the cyclic interaction of the master, in this case the microprocessor 11, with its slaves, in this case the bus nodes 91–96. Various schemes may be implemented to detect bus 4 failures such as a timeout, wherein the microprocessor 11 presumes that the bus node 91–96 has failed if it does not respond to a communication from the microprocessor 11 within a certain pre-determined amount of time. Another method is that each message transmitted on the bus 4 is tagged with an ID number in an increasing order. If a message ID is received by the microprocessor 11 such that it determines a message has been lost or has failed to have been transmitted, the microprocessor 11 can determine that a failure has occurred. An echo technique may also be used wherein the microprocessor 11 expects an acknowledgement for each and every communications message put on the bus from the respective node 91–96 to which it is addressed. If the microprocessor 11 does not receive an acknowledgement from the targeted node 91–96, the microprocessor 11 assumes the node 91–96 has failed. In a bit monitoring scheme, each transmitter on the bus 4 monitors the bus 4 to see if the sent bit is really seen on the bus 4. Once the node 91–96 realizes that the transmitted message is not being communicated to the bus 4, then the node 91–96 can report a failure to the master, i.e. the microprocessor 11. A bit stuffing technique may also be used to verify the integrity of messages wherein, based on a pre-determined algorithm, a transmitter inserts stuffed bits of opposite logic after a certain number of bits with the same logic level have been transmitted. Another technique is a CRC Checksum wherein a checksum is inserted in each message to verify message integrity. The message may also be formatted so that each message must fit into a pre-determined format of bit length and/or fields. An acknowledge check may also be implemented wherein at least one receiver has to acknowledge the reception of any transmitted message. Many of these communication techniques are implemented in the CAN bus standard, however additional techniques may be implemented to increase communications efficiency/and reliability.

Operational Modes

In an inspection mode the software program can install 'software bridges' in the safety chain so that various sensors, contacts or switches can be isolated for testing. Thus hardware wiring is no longer necessary to bridge a sensor, contact or switch. An important improvement over the prior art is that the 'software bridges' can be removed automatically by the program either using a time function or when the software program exits the inspection mode or returns to normal operations mode. In either case, human oversight is removed from the process because in the prior art an operator had to remove all of the hardware wiring or mechanical bridges that he installed for the maintenance work.

When the software program detects conditions which impair safe operation of the elevator, it may allow different modes of shutdown. If a significant overspeed signal is detected, the program would send a signal to the drive and brake unit 50 to immediately arrest the elevator car 60. However in other less threatening modes, such as a bus node 91–96 failure, the program may command the elevator car 60 to the nearest landing floor, open the doors and then shutdown. This would minimize the number of situations where passengers were trapped inside an elevator car 60 requiring a rescue operation to free the passengers.

PC Communications

A maintenance tool such as a personal computer PC (not shown) may be used to communicate with the microprocessor 11 for maintenance procedures. The PC can extract data from the microprocessor assembly 10$_1$ to provide a historical analysis. The PC can also monitor the execution of the microprocessor assembly 10$_1$ in a normal operations mode including emergency and degraded operations. The PC can also re-program or update the software code in the ROM 12 (in this case a Flash ROM would be used). The on-board battery 13 level may be monitored for replacement intervals.

The microprocessor assembly 10$_1$ may be mounted in such a manner as to detect a pin configuration, thus sensing the elevator's model type. Such configuration sensing helps assure that the software program installed in the ROM 12 is appropriate for the particular elevator that the electronic safety system 8 is being installed upon.

Figure 3:
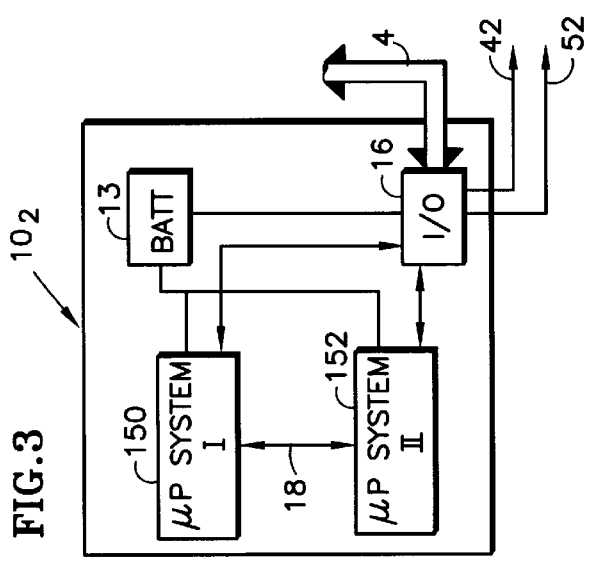
FIG. 3 is a high level system block diagram of a microprocessor assembly illustrating two microprocessor systems and their interfaces.

Dual Microprocessors (FIG. 3)

Referring to FIG. 3, a high level system block diagram of a microprocessor assembly 10$_2$ illustrating two microprocessor systems 150 & 152 and their interfaces is shown. In a further embodiment of this invention, two independent microprocessor systems 150 & 152 are shown in a microprocessor assembly 10$_2$. In this embodiment each of the microprocessor systems 150 & 152 are operating independently and sharing the I/O port 16 to communicate with the safety bus 4 and output discrete signals to the elevator control 40 and the drive and brake system 50 over their respective interfaces 42 & 52. Both microprocessor systems 150 & 152 are supported by the on board power backup system 13 to implement a safe shut down of the elevator system should the main power supply be lost as described in detail above. An interprocessor communications bus 18 connects the two microprocessor systems 150 & 152 to implement a checking scheme. In this embodiment each microprocessor 150 & 152 individually polls each of the nodes 91–96 on the safety bus 4 to receive status information and data. At predetermined intervals the microprocessors 150 & 152 communicate with each other over their interprocessor bus 18 to verify system integrity. If either microprocessor system 150 & 152 does not hear affirmatively from the other microprocessor system 150 & 152, then the first microprocessor system 150 & 152 will implement a safe shutdown of the elevator system. Also, if there is a discrepancy in the status determined by either microprocessor system 150 & 152, then the discrepancy will cause the elevator system to transition into a degraded mode, which may or may not include a shutdown, depending upon the severity of the discrepancy between the two microprocessor systems 150 & 152.

This embodiment may also be used with a dual redundant safety bus 4 as described in greater detail below. In that embodiment, each microprocessor would have its own I/O port 16 and a separate safety bus 4 to communicate with each of the nodes 91–96 throughout the elevator safety system 8.

The foregoing descriptions as to PC communications, pin configuration detection, and other features as they apply to a single microprocessor assembly $10_1$ apply equally as well to the dual microprocessor assembly $10_2$.

Figure 4:
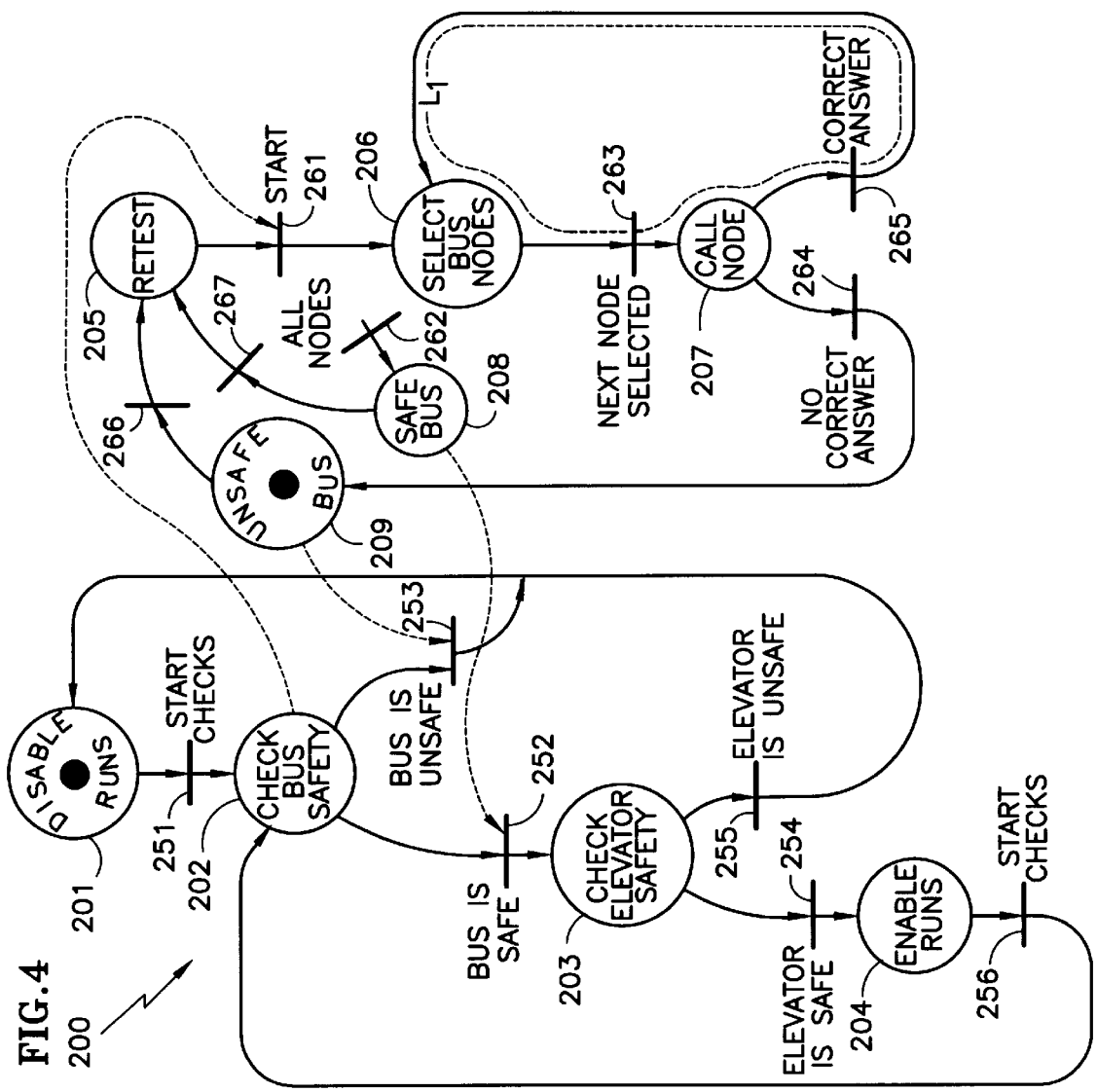
FIG. 4 is a state diagram illustrating the states of the electronic safety system.

State Machine Description (FIG. 4)

Referring to FIG. 4, a state diagram 200 illustrating the states of the electronic safety system 8 is shown. The safety system 8 transitions from an offline state, disable runs 201, to check bus safety 202 after a start checks 251 command is received. If the bus nodes 91–96 have not been polled previously within a certain pre-determined time period, the system 8 transitions after receiving the start input 261 to the select bus node 206 state. If all the nodes have not been polled, the system receives the next node selected command 263 and transitions to the call node state 207. In this state the system polls the selected node 91–96 and awaits an answer within a predetermined time frame. If the correct answer is received 265, the system 8 transitions back to the select bus node state 206. If a correct answer is not received 264 or no answer is received within the pre-determined time frame, the system 8 transitions to an unsafe bus state 209. The loop $L_1$ will continue to be executed as long as each node 91–96 responds satisfactorily until all nodes 91–96 have been polled. At that time the system 8 receives the all nodes input 262 and transitions to the safe bus state 208. The safe bus status is reported as input 252 and the system 8 transitions to the check elevator safety state 203. In this state 203, other various parameters of elevator inspection and maintenance are verified and if the elevator is determined to be safe 254, the system 8 continues in a enable runs state 204. However, if the elevator is determined to be unsafe 255, the system transitions to a disable runs state 201 where it remains until a new safety check is instituted at start checks 251. It should be noted that all bus unsafe determinations, for example, 253, 255, 209, and the transition from state 209 result in the elevator safety system 8 being put in the disable runs state 201. The only exit from this state 201 is to re-check the system 8 through check bus safety state 202. It should be noted that repetitive checks on the nodes 91–96 may be commanded from the safe bus state 208 and the unsafe bus state 209 through the inputs re-test 266 and re-test 267.

It should be noted that the above routines are repeated every 100 ms in any operational mode of the elevator safety system 8. Further given the known advantages of computer programming, the testing routines and methodology may be updated solely through a software change. As discussed previously, the code in the elevator safety system 8 can be updated by maintenance personnel downloading a new software version into the safety system's computer memory.

Dual Redundant Safety Bus

A further embodiment of the safety bus 4 is a dual redundant set of buses A & B. A redundant bus may be implemented with either a single microprocessor $10_1$ configuration or a dual microprocessor $10_2$ configuration. In either case two physically independent buses, A & B, are routed from the microprocessor assembly 20 throughout the elevator system to each of the nodes 91–96. Each node 91–96 has an independent transmitter and receiver pair (t/rA & t/rB) for each bus A & B. The purpose of the dual redundant bus is to provide a backup method of communications with each of the nodes 91–96 in case of failure of the primary bus, whether it be bus A or bus B.

In one embodiment bus A is designated the primary bus and is used for all communications with all nodes, whereas bus B is used as a backup bus in the event of a failure with any of the nodes 91–96. For example, if the controller 20 experienced a repetitive failure in communications with bus node 91, the software program would attempt communications over backup bus B with node 91. In this manner controller 20 is able to identify whether the communications failure is due to a bus failure or a node failure. Redundant buses increase the safety and reliability of the communications network. Other bus communication protocols are well known in the art, such as routinely alternating communications over bus A and bus B; and communicating over both bus A and bus B and comparing the data received.

In a single microprocessor $10_1$ embodiment as shown in FIG. 2, communications over both bus A and bus B are controlled by single microprocessor 11. In the embodiment as shown in FIG. 3, wherein there are dual microprocessors 150 & 152, each microprocessor 150 & 152 communicates independently over an assigned bus A or B. In this manner each microprocessor communicates independently with each of the nodes 91–96 in the elevator system 8. For example, while microprocessor 150 polls the nodes 91–96 over bus A, microprocessor 152 polls the nodes 91–96 over bus B. The collected data from the nodes 91–96 is then compared between the microprocessors 150 & 152 over interprocessor bus 18. Either microprocessor 150 & 152 is independently capable of commanding the elevator to a safe arrest through drive and motor unit interface 52.

The level of redundancy required with respect to both dual microprocessors and dual communication buses is determined by an analysis of the environment and requirements of the elevator system to be installed. Certain tradeoffs are made with respect to cost, reliability, and mean time between failures.

It should be noted that the communication interfaces above may be serial or parallel, proprietary or standardized. They may also be implemented by electrical, optical, or telemetry means.

From the above, it should be appreciated that the systems and apparatus described herein provide a reliable electronic safety system for elevator cars. It should also be appreciated that the electronic safety system apparatus of the present invention permits the reduction of parts, adjustment points, and failure modes while providing reliability and safety.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An elevator safety system comprising:
   an electronic safety controller in communication over a safety bus with a plurality of bus nodes;
   each said bus node receiving data from at least one sensor, wherein said safety controller further comprises a microprocessor assembly executing a safety program having multiple modes of operation including inspection and maintenance, normal operations, degraded operations, and emergency operations and wherein said safety bus further comprises:
      a dual redundant safety bus having a bus A and a bus B;
   said bus A and said bus B are physically independent from each other;
      each said bus node being in communication with both said bus A and bus B;
      wherein said safety program optionally communicates with each said bus node over either bus A or bus B or both, an elevator control unit in further communication with said electronic safety controller; and
   a drive and brake unit in even further communication with said electronic safety controller;
   wherein said microprocessor polls said bus nodes over said safety bus and processes said data received from said plurality of bus nodes and determines if an unsafe condition exists, and if so, said microprocessor sends an arrest signal to said drive and brake unit, and further sends a status signal to said elevator control.

2. An elevator safety system as in claim 1, wherein:
   said safety program executing in said inspection and maintenance mode will one of fail, isolate, and bridge in software said at least one sensor, to ascertain said safety system's response.

3. An elevator safety system as in claim 2, wherein:
   said at least one sensor includes a plurality of sensors; and
   said safety program executing in said inspection and maintenance mode will one of fail, isolate, and bridge in software said at least one sensor, in combination with another said at least one sensor to ascertain said safety system's response.

4. An elevator safety system as in claim 1, and further comprising:
   a first bus node located at a lower end of an elevator shaft and having a pit switch sensor;
   a second bus node located in a machine room and having an overspeed sensor;
   a plurality of landing door bus nodes, each said landing door bus node located near a landing door and having a landing door sensor; and
   at least one elevator car bus node located on an elevator car and having an inspection switch sensor, an emergency stop switch sensor, and an elevator car door sensor.

5. An elevator safety system as in claim 4, wherein:
   each said landing door sensor is operable to determine an open or closed state of said respective landing door; and
   each said landing door sensor provides said respective bus node with said open or closed state of their respective said landing door.

6. An elevator safety system as in claim 1, wherein said microprocessor assembly further includes:
   a microprocessor for executing said safety program;
   a read only memory for storing said safety program and predetermined data;
   a random access memory;
   a battery backup unit; and
   at least one input/output port for communications with said safety bus, said elevator control, and said drive and brake unit.

7. An elevator safety system as in claim 1, wherein said microprocessor assembly further includes:
   a first microprocessor for executing a first safety program;
   a second microprocessor for executing a second safety program; and
   said first and second microprocessor communicating with each other over a interprocessor bus; and
   wherein said first microprocessor polls said bus nodes over said safety bus, processes said data received from said plurality of bus nodes and communicates a first status message to said second microprocessor over said interprocessor bus;
   wherein said second microprocessor polls said bus nodes over said safety bus, processes said data received from said plurality of bus nodes and communicates a second status message to said first microprocessor over said interprocessor bus; and
   wherein one of said first and second microprocessor determines that said unsafe condition exists and sends said arrest signal to said drive and brake unit, and further sends said status signal to said elevator control.

8. An elevator safety system as in claim 7, wherein said
   each of said first and second microprocessor determine individually that said unsafe condition exists, and each of said first and second microprocessor sends said arrest signal to said drive and brake unit, and further sends said status signal to said elevator control.

9. An elevator safety system as in claim 7, wherein said safety bus further comprises:
   a dual redundant safety bus having a bus A and a bus B;
   said bus A and said bus B being physically independent from each other;
   each said bus node being in communication with both said bus A and said bus B;
   wherein said first microprocessor communicates with said nodes over said bus A and said second microprocessor communicates with said nodes over said bus B.

10. An elevator safety system as in claim 8, wherein said safety bus further comprises:
    a dual redundant safety bus having a bus A and a bus B;
    said bus A and said bus B being physically independent from each other;
    each said bus node being in communication with both said bus A and said bus B;
    wherein said first microprocessor communicates with said nodes over said bus A and said second microprocessor communicates with said nodes over said bus B.

* * * * *